(12) United States Patent
Sunagawa et al.

(10) Patent No.: US 6,723,762 B1
(45) Date of Patent: Apr. 20, 2004

(54) FOAMABLE VINYL CHLORIDE-BASE RESIN COMPOSITIONS

(75) Inventors: Takenobu Sunagawa, Takasago (JP); Noriko Sakashita, Akashi (JP); Mitsutaka Sato, Kobe (JP); Mamoru Kadokura, Takasago (JP)

(73) Assignee: Kaneka Corporation, Osaka (JP)

( * ) Notice: Subject to any disclaimer, the term of this patent is extended or adjusted under 35 U.S.C. 154(b) by 20 days.

(21) Appl. No.: 10/069,953

(22) PCT Filed: Sep. 13, 2000

(86) PCT No.: PCT/JP00/06236

§ 371 (c)(1),
(2), (4) Date: Mar. 7, 2002

(87) PCT Pub. No.: WO01/21692

PCT Pub. Date: Mar. 29, 2001

(30) Foreign Application Priority Data

Sep. 22, 1999 (JP) ............................................. 11-269069
Sep. 22, 1999 (JP) ............................................. 11-269070

(51) Int. Cl.$^7$ .................................................. C08J 9/08
(52) U.S. Cl. ........................... 521/82; 521/92; 521/93; 521/94; 521/134; 521/145
(58) Field of Search ............................. 521/82, 92, 93, 521/94, 134, 145

(56) References Cited

U.S. PATENT DOCUMENTS

| | | | |
|---|---|---|---|
| 3,879,313 | A | 4/1975 | Huntzinger et al. |
| 4,025,465 | A | 5/1977 | Dorrn et al. |
| 4,402,893 | A | 9/1983 | Kitamura et al. |
| 4,427,795 | A | 1/1984 | Dorrestijn et al. |
| 4,722,944 | A | 2/1988 | Mori et al. |
| 4,797,426 | A | 1/1989 | Waki et al. |
| 4,800,214 | A | 1/1989 | Waki et al. |
| 5,532,055 | A | 7/1996 | Igarashi et al. |
| 5,712,319 | A | 1/1998 | Suzuki et al. |

FOREIGN PATENT DOCUMENTS

| | | |
|---|---|---|
| JP | 50-126071 | 10/1975 |
| JP | 55-139435 | 10/1980 |
| JP | 55-149328 | 11/1980 |
| JP | 60-8330 | 1/1985 |
| JP | 1-274702 | 11/1989 |
| JP | 4-239046 | 8/1992 |
| JP | 6-9813 | 1/1994 |
| JP | 9-151269 | 6/1997 |
| JP | 9-216965 | 8/1997 |
| JP | 9-239707 | 9/1997 |
| JP | WO97/33936 | 9/1997 |
| JP | 10-101832 | 4/1998 |
| JP | 10-182911 | 7/1998 |
| JP | 10-36606 | 4/1999 |
| JP | 11-92608 | 4/1999 |
| JP | 2000-17095 | 1/2000 |
| JP | 2001-89591 | 4/2001 |
| JP | 2001-89592 | 4/2001 |

*Primary Examiner*—Morton Foelak
(74) *Attorney, Agent, or Firm*—Armstrong, Kratz, Quintos, Hanson & Brooks, LLP

(57) ABSTRACT

There is provided a foamable poly(vinyl chloride) resin composition which can remarkably improve an expansion ratio. There is used a foamable poly(vinyl chloride) resin composition comprising 100 parts by weight of (A) a poly(vinyl chloride) resin, 0.5 to 30 parts by weight of (B) a processing aid, and 0.5 to 15 parts by weight of water and 0 to 20 parts by weight of a thermal decomposition foaming agent as a foaming agent (C), wherein the processing aid is obtained by adding and polymerizing 0 to 50 parts of a monomer mixture (b) comprising 0 to 50% by weight of methyl methacrylate, 50 to 100% by weight of at least one monomer selected from the group consisting of methacrylate excluding methyl methacrylate and acrylate, and 0 to 20% by weight of a vinyl monomer copolymerizable therewith, in the presence of a latex of a (co)polymer obtained by emulsion polymerizing 50 to 100 parts by weight of a monomer mixture (a) comprising 50 to 100% by weight of methyl methacrylate, 0 to 50% by weight of a monomer selected from the group consisting of methacrylate excluding methyl methacrylate and acrylate, and 0 to 20% of a vinyl monomer copolymerizable therewith in an amount that a total amount of (a) and (b) is 100 parts by weight.

3 Claims, No Drawings

FOAMABLE VINYL CHLORIDE-BASE RESIN COMPOSITIONS

TECHNICAL FIELD

The present invention relates to a foamable poly(vinyl chloride) resin composition. Particularly, it relates to a foamable poly(vinyl chloride) resin composition which is excellent in processability and can provide a foamed article having a high expansion ratio.

BACKGROUND ART

Because a vinyl chloride resin provides articles which are excellent in physical properties such as impact resistance and heat resistance, and chemical properties such as solvent resistance, acid resistance and alkali resistance, it is widely used in construction materials and other various fields. Recently, a foaming method is paid attention to as a means for reducing weight of a vinyl chloride resin and lowering molding costs, and the market requires strong demand for foamed articles of a vinyl chloride resin having a high expansion ratio.

In the foaming of the vinyl chloride resin, there is generally known a method in a combination use of a processing aid mainly comprising methyl methacrylate and a foaming agent.

If a foaming agent comprising an easily volatile organic solvent such as an aliphatic hydrocarbon and an aliphatic hydrocarbon halide are used as the foaming agent, it is known that foaming in a high expansion is possible.

For example, Japanese Examined Patent Publication No. 10540/1985 and No. 40986/1983 disclose that foamed articles having a high expansion ratio of tens times can be obtained by impregnating organic solvents with a boiling point of at most 90° C., such as butane and dichloro fluoromethane, into a vinyl chloride resin, or by directly feeding into an extruder during an extrusion process.

However, the foaming agent of the organic solvent is more disadvantageous than a substance generating water or steam by heating from the viewpoint of cost, since it requires an equipment for impregnation, explosion proof, and the like in a foaming process.

On the other hand, if thermal decomposition foaming agents such as a thermal decomposition organic foaming agent and a thermal decomposition inorganic foaming agent are used as a foaming agent, it is difficult to increase an expansion ratio to about 3 to 4 times at least, to uniform the molding surface and keep the foamed cell uniform and fine.

For example, Japanese Examined Patent Publication No. 9540/1988 discloses a foamable poly(vinyl chloride) resin composition which is obtained by adding a methacrylate resin (poly(methyl methacrylate) having polymerization degree of 2,000 to 30,000 and a weight average molecular weight of 200,000 to 3,000,000), a thermal decomposition organic foaming agent such as azodicarbonamide, a thermal decomposition inorganic foaming agent such as sodium bicarbonate, and filler such as calcium carbonate into a vinyl chloride resin having an average polymerization degree of 500 to 800. If the foamable poly(vinyl chloride) resin composition is used for forming, foamed articles can be obtained, which have uniform and fine foamed cells and are excellent in surface smoothness and surface hardness. But the expansion ratio thereof is about 3 to 4 times.

Japanese Unexamined Patent Publication No. 9813/1994 discloses a foamable poly(vinyl chloride) resin composition, which is obtained by adding a methacrylate resin and a bicarbonate salt having at most 10 $\mu$m size as a thermal decomposition foaming agent to a vinyl chloride resin. If the foamable poly(vinyl chloride) resin composition is used for molding, foamed articles can be obtained, which have uniform and fine foamed cells, and are excellent in thermal stability and weatherability, but there is no description of an expansion ratio.

And Japanese Unexamined Patent Publication No. 151269/(1997) discloses a foamable poly(vinyl chloride) resin composition, which is obtained by mixing a poly (methyl methacrylate) resin having a weight average molecular weight of 4,500,000 to 7,000,000 and a thermal decomposition foaming agent into a vinyl chloride resin. If the foamable poly(vinyl chloride) resin composition is used for molding, it is described that foamed articles can be obtained which have uniform foamed cells and cause no resin decomposition. But the expansion ratio thereof is about 2 to 3 times.

Furthermore, Japanese Unexamined Patent Publication No. 278336/(1995) discloses that a foamed article having a high expansion ratio is obtained by adding water to a thermoplastic elastomer and foaming. As the thermoplastic elastomer, there is used a resin which is obtained by copolymerizing poly(vinyl chloride) with a rubber component such as NBR, and a general vinyl chloride resin is not used.

In addition, Japanese Unexamined Patent Publication No. 194620/1997 discloses a foamed article which is obtained by irradiating micro wave to the thermoplastic resin composition obtained by adding a substance containing water to thermoplastic resin. But the expansion ratio thereof is about 2 to 5 times.

The object of the present invention is to provide a foamable poly(vinyl chloride) resin composition which can greatly improve an expansion ratio without using any foaming agent of an organic solvent, but by using a substance generating water or steam by heating, or by using a thermal decomposition foaming agent in a combination use of the substance in the foaming process.

DISCLOSURE OF INVENTION

Investigation is carried out in order to solve the above-mentioned problems, and it is discovered that an expansion ratio can be remarkably improved by using a vinyl chloride resin in a combination use of the particular (meth)acrylate copolymer and water, or water and a thermal decomposition foaming agent, compared with the conventional composition to complete the present invention.

Namely, the present invention relates to a foamable poly(vinyl chloride) resin composition comprising 100 parts by weight of (A) a poly(vinyl chloride) resin, 0.5 to 30 parts by weight of (B)a processing aid, and 0.5 to 15 parts by weight of water and 0 to 20 parts by weight of a thermal decomposition foaming agent as a foaming agent (C), wherein the processing aid is obtained by adding and polymerizing 0 to 50 parts by weight of a monomer mixture (b) comprising 0 to 50% by weight of methyl methacrylate, 50 to 100% by weight of at least one monomer selected from the group consisting of methacrylate excluding methyl methacrylate and acrylate, and 0 to 20% by weight of a vinyl monomer copolymerizable therewith, in the presence of a latex of a (co)polymer obtained by emulsion polymerizing 50 to 100 parts by weight of a monomer mixture (a) comprising 50 to 100% by weight of methyl methacrylate, 0 to 50% by weight of a monomer selected from the group consisting of methacrylate excluding methyl methacrylate and acrylate, and 0 to 20% by weight of a vinyl monomer copolymerizable therewith in an amount that a total amount of (a) and (b) is 100 parts by weight.

In the foamable poly(vinyl chloride) resin composition, the water is preferably steam generated by heating 0.5 to 30 parts by weight of a substance.

In the foamable poly(vinyl chloride) resin composition, the processing aid (B) is preferably a (meth)acrylate copolymer which is obtained by adding and polymerizing 0 to 50 parts by weight of a monomer mixture (b) comprising 0 to 50% by weight of methyl methacrylate, 50 to 100% by weight of at least one monomer selected from the group consisting of methacrylate excluding methyl methacrylate and acrylate, and 0 to 20% by weight of a vinyl monomer copolymerizable therewith and wherein specific viscosity at 30° C. of the solution containing 0.1 g of the polymer mixture in 100 mL of chloroform is at least 0.5, in the presence of a latex of a (co)polymer which is obtained by emulsion polymerizing 50 to 100 parts by weight of a monomer mixture (a) comprising 50 to 100% by weight of methyl methacrylate, 0 to 50% by weight of a monomer selected from a group consisting of methacrylate excluding methyl methacrylate and acrylate, and 0 to 20% of a vinyl monomer copolymerizable therewith in an amount that a total amount of (a) and (b) is 100 parts by weight and wherein specific viscosity at 30° C. of the solution containing 0.1 g of the polymer mixture in 100 mL of chloroform is at least 0.7.

BEST MODE FOR CARRYING OUT THE INVENTION

The present invention comprises a (co)polymer obtained by emulsion polymerizing a monomer mixture (a) containing a major amount of methyl methacrylate as a component at the first step, and then a (co)polymer obtained by adding and polymerizing a monomer mixture (b) containing a major amount of at least one monomer selected from the group consisting of methacrylate excluding methyl methacrylate and acrylate (hereinafter also referred to as "polymer at the second step"). Particularly, the present invention is characterized in that a polymer mixture obtained by two step polymerization is used as a processing aid of a vinyl chloride resin, in which specific viscosity at 30° C. of a solution consisting 0.1 g of a (co)polymer containing a major amount of methyl methacrylate (hereinafter referred to as "polymer at the first step) in 100 mL of chloroform is at least 0.7, and specific viscosity at 30° C. of a solution containing 0.1 g of a polymer at the second step in 100 mL of chloroform is at least 0.5. By using the polymer mixture obtained by two step polymerization as a processing aid of a vinyl chloride resin and using water or water and a thermal decomposition foaming agent as a foaming agent in a combination use thereof, effects of improving an expansion ratio at foaming can be remarkably expressed by adding them in a small amount thereof without loosing excellent physical and chemical properties which a vinyl chloride resin originally has.

There is no particular limitation for the vinyl chloride resin (A) used in the present invention, and there can be used any vinyl chloride resin which has been conventionally used. The vinyl chloride resin is preferably a (copolymer comprising 80 to 100% by weight of a vinyl chloride unit and 0 to 20% by weight of the other monomer unit copolymerizable therewith.

Examples of the other monomer copolymerizable with poly(vinyl chloride) are vinyl acetate, propylene, styrene, acrylate (alkyl acrylate with 1 to 8 carbon atoms of the alkyl group such as methyl acrylate, ethyl acrylate, butyl acrylate and octyl acrylate), and the like. These may be used solely or in a combination use of two or more thereof.

There is no particular limitation for an average polymerization degree of the vinyl chloride resin, but those having about 400 to 800 are generally used.

Examples of the vinyl chloride resin are poly(vinyl chloride), a copolymer comprising at least 80% by weight of a vinyl chloride monomer unit and at most 20% by weight of a monomer unit derived from vinyl acetate, propylene, styrene and acrylate, post-chlorinated poly(vinyl chloride), and the like. These may be used solely or in a combination use of two or more thereof.

The processing aid (B) used in the present invention comprises a two-step polymer mixture obtained by adding and polymerizing a monomer mixture (b) in the presence of a latex of polymer at the first step obtained by emulsion polymerizing a monomer mixture (a). This is a component used for improving foamability without lowering properties of the vinyl chloride resin such as the excellent transparency.

The monomer mixture (a) need contain 50 to 100% by weight of methyl methacrylate, and the amount is preferably 60 and 90% by weight, and more preferably 70 to 85% by weight. The monomer mixture (a) need contain 0 to 50% by weight of a monomer selected from the group consisting of methacrylate excluding methyl methacrylate and acrylate, and the amount is preferably 10 to 40% by weight, and more preferably 15 to 30% by weight. If the amount thereof in the monomer mixture (a) is less than 50% by weight, transparency and foamability become low. If the amount of the monomer selected from the group consisting of methacrylate excluding methyl methacrylate and acrylate is more than 50% by weight, transparency and foamability become low.

The monomer mixture (a) need contain 0 to 20% by weight of a vinyl monomer copolymerizable therewith. An upper amount thereof is preferably 10% by weight, and more preferably 5% by weight. If the amount thereof is more than 20% by weight, transparency and foamability become low.

Examples of the methacrylate excluding methyl methacrylate in the monomer mixture (a) are alkyl methacrylates with 2 to 8 carbon atoms of an alkyl group such as ethyl methacrylate, propyl methacrylate, butyl methacrylate and 2-ethylhexyl methacrylate. Examples of the acrylate are alkyl acrylates with 2 to 8 carbon atoms of an alkyl group such as methyl acrylate, ethyl acrylate, propyl acrylate, butyl acrylate, and 2-ethylhexyl acrylate. These methacrylates excluding methyl methacrylate and acrylate may be used solely or in a combination use of two or more thereof.

Examples of the vinyl monomer copolymerizable therewith in the monomer mixture (a) are aromatic vinyl compounds such as styrene and α-methyl styrene, and unsaturated nitrile compounds such as acrylonitrile. These may be used solely or in a combination use of two or more thereof.

There is no particular limitation for specific viscosity of the solution measured at 30° C., which is obtained by dissolving 0.1 g of (co)polymer (polymer at the first step) obtained by emulsion polymerizing the monomer mixture (a) in 100 mL of chloroform. But it is preferably 0.7 to 1.9, more preferably 0.8 to 1.8, more preferably 0.8 to 1.7, and particularly preferably 0.9 to 1.6. If the specific viscosity is less than 0.7, expansion ratio can not be improved. If it is more than 1.9, foamability and processability tend to become low.

It is necessary to form a (co)polymer comprising the mixture (b) on the outer layer of the polymer at the first step by polymerizing the monomer mixture (b) in the presence of polymer latex at the first step. By forming the a (co)polymer comprising the mixture (b) on the outer layer of the polymer at the first step, gelation is promoted and ungelated substance can be prevented from generating, if the processing aid is added to the vinyl chloride resin. As a result, viscosity and elasticity can be efficiently imparted to the vinyl chloride resin.

The monomer mixture (b) need contain 0 to 50% by weight of methyl methacrylate, preferably 20 to 49% by weight, more preferably 30 to 45% by weight. The monomer mixture (b) need contain 50 to 100% by weight of at least one monomer selected from the group consisting of methacrylate excluding methyl methacrylate, and acrylate, preferably 51 to 80% by weight, and more preferably 55 to 70% by weight. If the amount of methyl methacrylate in the monomer mixture (b) is more than 50% by weight, satisfactory gelation property is lost, ungelated substance tends to be generated, and foamability becomes low. If the amount of at least one monomer selected from the group consisting of methacrylate excluding methyl methacrylate, and acrylate is less than 50% by weight, the same thing occurs.

The monomer mixture (b) need contain 0 to 20% by weight of vinyl monomer copolymerizable therewith, and the upper limit thereof is preferably 10% by weight, more preferably 5% by weight. If the amount thereof is more than 20% by weight, transparency and foamability become low.

Examples of the methacrylate excluding methyl methacrylate in the monomer mixture (b) are alkyl methacrylates having 2 to 8 carbon atoms of an alkyl group such as ethyl methacrylate, propyl methacrylate, butyl methacrylate, and 2-ethylhexyl methacrylate. Examples of the acrylate are alkyl acrylates having 1 to 8 carbon atoms of an alkyl group such as methyl acrylate, ethyl acrylate, propyl acrylate, butyl acrylate, and 2-ethylhexyl acrylate. These methacrylates excluding methyl methacrylate, and acrylate may be used solely or in a combination use of two or more thereof. Among those, butyl acrylate is preferable from the viewpoint that a polymer with a low glass transition temperature can be obtained.

Examples of the vinyl monomer copolymerizable therewith in the monomer mixture (b) are aromatic vinyl compounds such as styrene and α-methylstyrene, and unsaturated nitrile compounds such as acrylonitrile. These may be used solely or in a combination of two or more thereof.

With respect to a ratio of the monomer mixture (a) to the monomer mixture (b) used for preparing the processing aid of the present invention, the monomer mixture (a) need be mixed with 50 to 100 parts by weight thereof, preferably 60 to 95 parts by weight, and more preferably 65 to 90 parts by weight, if two mixtures are mixed in a total amount of 100 parts by weight. On the other hand, the monomer mixture (b) need be mixed in an amount of 0 to 50 parts by weight, preferably 5 to 40 parts by weight, and more preferably 10 to 35 parts by weight.

When the monomer mixture (a), namely, the polymer at the first step is less than about 50 parts by weight, gelation property of a vinyl chloride resin can not be sufficiently improved and sufficient foamability can not be obtained. When the amount of the monomer mixture (b), that is, the (co)polymer obtained from the monomer mixture (b) is more than about 50 parts by weight, gelation property, transparency and foamability are lost in case that the vinyl chloride resin is made from the materials. The (co)polymer obtained from monomer mixture (b) can particularly improve gelation property, processability, and foamability by forming the polymer at the first step on the outer layer thereof. As a result, effects of adding the processing aid of the present invention can be remarkably improved.

The processing aid (B) of the present invention is prepared by the following method.

Firstly, the monomer mixture (a) is emulsion polymerized in the presence of a suitable medium, an emulsifier, a polymerization initiator, a chain transfer agent etc. to obtain the polymer latex at the first step from the monomer mixture (a). As a polymerization method, emulsion polymerization need be used from the viewpoint that it can increase specific viscosity thereof. Then, the monomer mixture (b) is successively added to the polymer latex at the first step to carry out polymerization. By successively polymerizing each mixture in this way, polymer at the first step is formed into an inner layer and the (co)polymer from the monomer mixture (b) is formed into an outer layer to prepare a polymer prepared by two-step polymerization.

The dispersion medium used for the emulsion polymerization is generally water.

As the emulsifier, there may be used the conventional emulsifier. Examples thereof are anionic surfactants such as a fatty acid ester, an alkylsulfate, an alkylbenzensulfonate, an alkylphosphorate and sulfosuccinate diester, and nonionic surfactants such as polyoxyethylene alkyl ether and polyoxyethylene fatty acid ester, and the like.

As the polymerization initiator, there may be used water soluble or oil soluble polymerization initiators. For example, there may be solely used inorganic polymerization initiators such as a conventional peroxosulfate, an organic peroxide and an azo compound. But these initiators may be used as a redox system in a combination use of sulfite, thiosulfate, primary metal salt, sodium formaldehyde sulfoxylate and the like. Examples of the preferable peroxosulfate are sodium persulfate, potassium persulfate, ammonium persulfate and the like, and examples of the preferable organic peroxide are t-butyl hydroperoxide, cumene hydroperoxide, benzoyl peroxide, lauroyl peroxide ant the like.

There is no particular limitation for the chain transfer agent, but, for example, t-dodecylmercaptan, t-decylmercaptan, n-dodecylmercaptan, n-decylmercaptan, etc. can be used. A specific viscosity can be suitably adjusted by a ratio of the monomer to the polymerization initiator or the kind of the mercaptan.

There is no particular limitation for a temperature or time at the emulsion-polymerization reaction, and these may be suitably adjusted to achieve the predetermined specific viscosity and particle size depending on application purpose.

The monomer mixture (b) need be added after confirming completion of polymerization at the previous step, in order to carry out polymerization at each stop without mixing with the monomer mixture (a) at the previous step.

Polymerization at the following step carried out by adding the monomer mixture (b) is preferably an emulsion polymerization method from the viewpoint that it can increase specific viscosity thereof. There is no particular limitation for an emulsifier, a polymerization initiator and a chain transfer agent used in the following step polymerization. And reaction conditions such as time and a temperature at polymerization reaction may be suitably adjusted depending on application purpose.

The polymer mixture latex obtained by two step polymerization has an average particle size of 100 to 3000 Å, preferably 100 to 2000 Å. And it can be removed according to salting out by adding a conventional electrolyte, coagulation, or spraying in hot air for drying. Cleaning, dehydrating, drying, etc. are carried out by the ordinary method, if necessary.

There is no particular limitation for specific viscosity of the polymer mixture prepared by two step polymerization measured at 30° C. by using 0.1 g thereof in 100 ml of chloroform. But it is preferably 0.5 to 1.7, more preferably 0.6 to 1.6, and more preferably 0.7 to 1.5. If the specific viscosity is less than 0.5, an expansion ratio can not be improved. If it is more than 1.7, foamability and processability become low.

The polymer mixture prepared by two step polymerization is usually added to the vinyl chloride resin as a processing aid in the form of white powder having 30 to 300 μm of an average particle size.

The processing aid (B) of the present invention is added to a vinyl chloride resin according to the ordinary method to prepare the foamable vinyl chloride resin composition of the present invention.

An amount of the processing aid is 0.5 to 30 parts by weight based on 100 parts of the vinyl chloride resin, preferably 5 to 25 parts by weight, and more preferably 8 and 25 parts by weight. If the amount thereof is less than 0.5 part by weight, effects of adding the processing aid can not be sufficiently revealed. If it is more than 30 parts by weight, the excellent mechanical properties of the vinyl chloride resin become low.

An amount of water as the forming agent (C) is 0.5 and 15 parts by weight based on 100 parts by weight of the vinyl chloride resin, preferably 1 to 10 parts by weight, and more preferably 2 to 8 parts by weight. If the amount thereof is less than 0.5 part by weight, a foamed article having a sufficient expansion ratio can not be obtained. If it is more than 15 parts by weight, a uniform molded article can not be obtained easily, and shrinkage of the article immediately after extrusion becomes high.

The amount of water added as the foaming agent (C) may be changed depending on an amount of the processing aid (B). For example, if 10 parts by weight of the processing aid are added based on 100 parts by weight of the vinyl chloride resin, 0.5 to 10 parts of water are preferably added. And if 20 parts by weight of the processing aid are added, 2 to 15 parts by weight of water are preferably added.

There is no particular limitation for a method of adding water used as the foaming agent (C) in the present invention to the vinyl chloride resin composition. But water may be gradually added while a vinyl chloride resin, a processing aid, and the other compounding agents other than water are stirred with a mixer, or water may be fed by pressure in an extruder. Or water may be previously impregnated in the (meth)acrylate copolymer as the processing aid, and a water content may be adjusted by gradually drying dehydrated slurry of the (meth)acrylate copolymer after emulsion polymerization.

As the foaming agent, the substance generating steam by heating is preferable from the viewpoint that it can be blended in a dry state in case of blending in a mixer and it is easy to feed it into a hopper of an extruder.

Examples of the substance generating steam by heating used as the foaming agent (C) are an inorganic substance with crystallization water, an inorganic substance generating steam by thermal decomposition, water-absorbing resin and the like. They are preferable from the viewpoint that it is easy to mix them with a mixer and to feed them into a hopper of an extruder, since they are in a dry state at a room temperature.

Examples of the inorganic substance having crystallization water are zeolite, zinc sulfate, alumina white, aluminum sulfate, aluminum silicate, ammonium alum, sodium sulfite, calcium nitrate, gypsum, potassium alum, ammonium tungstate, iron (II) sulfate, iron (II) chloride, sodium ferocyanide, sodium tetraborate, magnesium chloride, magnesium hydroxide, magnesium sulfate, manganese sulfate, sodium hypophosphite, sodium diphosphate, zirconium oxychloride, hydrotarsite and the like.

Examples of the inorganic substance generating steam by thermal decomposition are boric acid, aluminum hydroxide, tin hydroxide and the like.

Examples of the water absorbing resin are poly(vinyl alcohol), poly(sodium acrylate), poly(hydroxyethyl methacrylate) and the like.

The substance generating steam by heating may be used solely or in a combination of two or more thereof. Among those, boric acid, zeolite, tin hydroxide and the like are preferable from the viewpoint of foaming efficiency and cost.

An amount of the substance generating steam by heating is 0.5 to 30 parts by weight based on 100 parts by weight of the vinyl chloride resin, preferably 1 to 25 parts by weight, and more preferably 1 to 20 parts by weight. If the amount thereof is less than 0.5 part by weight, a foamed article having a sufficient expansion ratio can not be obtained. If the amount is more than 30 parts by weight, a uniform foamed article can not easily obtained.

The amount of the substance generating steam by heating may be changed depending on the amount of processing aid. For example, if 10 parts by weight of the processing aid are added to 100 parts by weight of vinyl chloride resin, it is preferable to add 1 to 15 parts by weight of the substance generating steam by heating. If 20 parts of the processing aid are added, it is preferable to add 2 to 20 parts of the substance generating steam by heating.

Examples of the thermal decomposition foaming agent used as a foaming agent (C) in the present invention are thermal decomposition inorganic foaming agent and thermal decomposition organic foaming agent. Examples of the thermal decomposition inorganic forming agent are sodium bicarbonate, potassium bicarbonate, ammonium bicarbonate, sodium carbonate, ammonium carbonate, and the like. Examples of the thermal decomposition organic foaming agent are nitroso compounds such as N,N'-dinitrosopentamethylenetetramine and N,N'-dimethyl-N,N' dinitrosoterephthalamide, azo compounds such as azo dicarbonamide and azo bisisobutylonitril, sulfonylhydrazide compounds such as benzenesulfonyl hydrazide, toluenesulfonyl hydrazide, and the like. These may be used solely or in a combination use of two or more thereof. Among those, sodium bicarbonate and azo dicarbonamide are preferable from the viewpoint of foaming efficiency and cost.

The thermal decomposition foaming agent is added in an amount of 0 and 20 parts by weight based on 100 parts by weight of a vinyl chloride resin, and the upper limit thereof is preferably 15 parts by weight, and more preferably 12 parts by weight. If the amount thereof is more than 20 parts by weight, a uniform foamed article can not easily obtained.

To the foamable vinyl chloride resin composition of the present invention can be solely added the other additives such as a stabilizer, a lubricant, an impact modifier, a plasticizer, a pigment, and filler or in a combination use of two or more thereof, if necessary.

In the preparation method of the foamable vinyl chloride resin composition of the present invention, for example, a vinyl chloride resin, the processing aid, water, the thermal decomposition foaming agent and the other additives may be added with stirring by a mixer, or they may be pressure-fed in an extruder. In addition, after water is previously impregnated in a (meth)acrylate copolymer as the processing aid, it may be mixed with the vinyl chloride resin, the processing aid, the thermal decomposition foaming agent, and the other additives. Or they may be mixed after adjusting the water content by gradually drying the dehydrated cake of the (meth)acrylate copolymer after emulsion polymerization.

There is no particular limitation for molding method of the foamable vinyl chloride resin composition of the present invention, and a generally used molding method such as extrusion method may be applied.

EXAMPLES

The present invention is explained more in detail by using Examples and Comparative Examples, but the present invention should not be limited thereto.

Evaluation methods used in Examples and Comparative Examples are summarized below.

(Measurement of Specific Viscosity of Polymer Mixture at First Step and Polymer at Second Step Polymer Mixture (Processing Aid))

0.1 g of polymer sample was dissolved in 100 mL of chloroform. Specific viscosity was measure by using a Ubbelohde viscometer in 30° C. water bath.

(Measurement of Expansion Ratio)

After measuring specific gravity of the obtained powder compound (non-foamed article of a vinyl chloride resin composition), it was molded with an extruder having a small single screw attached to the LABOPLAST MILL available from Toyo Seiki. Specific gravity of the foamed molded article having round bar shape (foamed article of a vinyl chloride resin composition) was measured to calculate an expansion ratio from the value by using the following equation:

Expansion ratio=(specific gravity of non-foamed article of vinyl chloride resin composition)/(specific gravity of foamed article of vinyl chloride resin composition)

Extruder specifications and molding conditions are shown below.

Extruder specifications

Screw: L/D=20; compression ratio=2.7; rotating speed= 30 rpm

Die: diameter=5 mm; land length=20 mm

Molding conditions

Molding temperature: C1=170° C., C2=175° C., C3=180° C.

Die=185° C.

(Measurement of Polymerization Conversion)

Polymerization conversion was calculated by using the following equation:

Polymerization conversion (%)={amount of obtained polymer/ amount of used monomer}×100

(Measurement of Average Particle Size of Latex)

An average particle size of the obtained latex was measured by using light scattering at 546 nm wavelength with U-2000 spectrophotometer made by Hitachi, Ltd.

(Evaluation of Cell Shape)

With respect to cell shape of the obtained articles, appearance was visibly observed to evaluate it based on the following criteria.

◯: Cell structure is uniform and appearance is excellent.

Δ: There are destroyed cells.

X: A majority of cells is collapsed and appearance thereof is bad.

Example 1

An 8 L reactor with a stirrer was charged with 0.7 part of sodium dioctylsulfosuccinic previously dissolved in water as an emulsifier and water in an amount that a total amount of water including water of the auxiliary materials added thereafter becomes 200 parts by weight. After removing oxygen in a space and water by flowing nitrogen in the gaseous part and the liquid part of the reactor, the mixture was heated to 70° C. with stirring. To the reactor was simultaneously added a monomer mixture at the first step comprising 60 parts of methyl methacrylate (hereinafter referred to as MMA) and 20 parts by weight of butyl acrylate (hereinafter referred to as BA). Then, 0.005 part of potassium persulfate as a polymerization initiator was added and the mixture was stirred for one hour to complete substantially polymerization. Thereafter, a monomer mixture at the second step comprising 6 parts of MMA and 14 parts of BA was dropwise added at a rate of about 30 parts per hour. After completion of addition, the mixture was kept at 70° C. for 90 minutes and cooled to obtain a latex. An average particle size thereof was measured. Results are shown in Table 1.

Polymerization conversion thereof was 99.5%. The obtained latex was salted out and coagulated with an aqueous solution of calcium chloride, and the mixture was heated to 90° C. and thermally treated. By using a centrifugal dehydrator, the mixture was filtered. The dehydrated cake of the polymer mixture prepared by two step polymerization was washed with water in an amount of the same weight of the polymer prepared by two step polymerization, and dried under the conditions of 50° C. for 15 hours by a parallel stream dryer to obtain a polymer sample prepared by two step polymerization (1) in the form of white powder. Specific viscosity of the obtained polymer sample (1) was measured. Results are shown in Table 1.

Next, there were mixed 10.0 parts of the polymer sample (1), 6.0 parts of calcium carbonate, 2.0 parts of tin oxide, 2.0 parts of octyl tin mercapto type stabilizer (TVS #8831 available from Nitto Kasei), 0.6 part of calcium stearate, 0.1 part of hydroxystearic acid (LOXIOL G-2 1 available from Henkel), 0.9 part of aliphatic alcohol dibasic ester (LOXIOL G-60 available from Henkel), and 0.6 part of polyethylene wax (ACPE-617A available from Allied Chemical) with 100 parts of poly(vinyl chloride) (KANEVINYL S-1007 available from KANEKA CORPORATION, average polymerization degree: 680) by using a Henshell mixer. The mixture was heated to 110° C. of the inside temperature and then cooled. To the mixture was added 3.0 parts of water, and mixed to prepare a powder compound. The article was formed with an extruder with a small single screw attached to LABOPLAST MILL made by Toyo Seiki to evaluate cell shape of the foamed article having round bar shape and measure an expansion ratio thereof. Results are shown in Table 1.

Examples 2 to 7 and Comparative Examples 1 to 3

Polymer samples (2) to (10) were obtained according to the components and the compositions shown in Table 1 in the same manner as shown in Example 1 to measure properties thereof. And the obtained polymer samples (2) to (10) were mixed with a poly(vinyl chloride) in the same manner as in Example 1 to obtain the foamed article having a round bar shape and evaluate the properties thereof. These samples were designated as Examples 2 to 7 and Comparative Examples 1 to 3, respectively. Results are shown in Table 1.

Abbreviations in Table 1 shows the following monomers (the same as in the following Tables).

MMA: methyl methacrylate

BMA: butyl methacrylate

BA: butyl acrylate

EA: ethyl acrylate

AN: acrilonitrile

St: Styrene

TABLE 1

| | | Example No. | | | | | | | Comparative Example | | |
|---|---|---|---|---|---|---|---|---|---|---|---|
| | | 1 | 2 | 3 | 4 | 5 | 6 | 7 | 1 | 2 | 3 |
| polymer sample No. | | (1) | (2) | (3) | (4) | (5) | (6) | (7) | (8) | (9) | (10) |
| composition (parts) | | | | | | | | | | | |
| monomer mixture at first step | MMA | 60 | 65 | 65 | 68 | 65 | 70 | 75 | 24 | 32 | 48 |
| | BMA | — | — | 10 | — | — | — | — | — | — | — |
| | BA | 20 | 10 | — | — | — | 4 | — | 56 | 48 | — |
| | EA | — | — | — | 12 | 5 | — | — | — | — | 12 |
| | AN | — | 5 | — | — | 10 | — | 5 | — | — | — |
| | St | — | — | 5 | — | — | 6 | — | — | — | 20 |
| monomer mixture at second step | MMA | 6 | 6 | 6 | 6 | 6 | 6 | 6 | 6 | 6 | 6 |
| | BA | 14 | 14 | 14 | 14 | 14 | 14 | 14 | 14 | 14 | 14 |
| specific viscosity of polymer at first step | | 1.11 | 1.13 | 1.12 | 1.12 | 1.11 | 1.11 | 1.06 | 1.11 | 1.12 | 1.03 |
| specific viscosity of polymer at second step | | 0.80 | 0.84 | 0.80 | 0.80 | 0.81 | 0.82 | 0.79 | 0.80 | 0.82 | 0.80 |
| average particle size of latex (Å) | | 1600 | 1600 | 1500 | 1600 | 1700 | 1500 | 1600 | 1600 | 1600 | 1700 |
| foamability | | | | | | | | | | | |
| expansion ratio (times) | | 11.7 | 10.0 | 9.3 | 14.0 | 8.2 | 8.2 | 7.4 | 2.8 | 2.6 | 2.7 |
| cell shape | | ○ | ○ | ○ | ○ | ○ | ○ | ○ | Δ | Δ | Δ |

From the results in Table 1, compositions having excellent foamability can be obtained by using polymer samples (1) to (7), but sufficient foamability can not be revealed by using polymer samples (8) to (10), of which composition of the mixture at the first step is out of the range of the present invention.

Examples 8 to 14 and Comparative Examples 4 to 6

By using polymer samples (1) to (10) obtained in Examples 1 to 7 and Comparative Examples 1 to 3, molded articles having a round bar shape were obtained in the same manner as in Example 1 except that 4.0 parts of boric acid was added instead of 3.0 parts of water as a foaming agent, to evaluate the properties thereof. These samples were designated as Examples 9 to 14 and Comparative Examples 4 to 6, respectively. Results are shown in Table 2.

From the results in Table 2, compositions having excellent foamability can be obtained by using polymer samples (1) to (7), but sufficient foamability can not be revealed by using polymer samples (8) to (10), wherein amounts of methacrylate other than methyl methacrylate, acrylate and vinyl monomer copolymerizable therewith were increased beyond the range of the present invention.

Examples 15 to 19 and Comparative Examples 7 to 9

According to the components and the compositions shown in Table 3, polymer samples (11) to (18) were obtained in the same manner as in Example 1 to measure properties thereof. And the obtained polymer samples (11) to (18) were mixed with poly(vinyl chloride), respectively, in the same manner as in Example 1 to obtain the foamed article having a round bar shape to evaluate the properties thereof. These samples were designated as Examples 15 to

TABLE 2

| | | Example No. | | | | | | | Comparative Example | | |
|---|---|---|---|---|---|---|---|---|---|---|---|
| | | 8 | 9 | 10 | 11 | 12 | 13 | 14 | 4 | 5 | 6 |
| polymer sample No. | | (1) | (2) | (3) | (4) | (5) | (6) | (7) | (8) | (9) | (10) |
| composition (parts) | | | | | | | | | | | |
| monomer mixture at first step | MMA | 60 | 65 | 65 | 68 | 65 | 70 | 75 | 24 | 32 | 48 |
| | BMA | — | — | 10 | — | — | — | — | — | — | — |
| | BA | 20 | 10 | — | — | — | 4 | — | 56 | 48 | — |
| | EA | — | — | — | 12 | 5 | — | — | — | — | 12 |
| | AN | — | 5 | — | — | 10 | — | 5 | — | — | — |
| | St | — | — | 5 | — | — | 6 | — | — | — | 20 |
| monomer mixture at second step | MMA | 6 | 6 | 6 | 6 | 6 | 6 | 6 | 6 | 6 | 6 |
| | BA | 14 | 14 | 14 | 14 | 14 | 14 | 14 | 14 | 14 | 14 |
| specific viscosity of polymer at first step | | 1.11 | 1.13 | 1.12 | 1.12 | 1.11 | 1.11 | 1.06 | 1.11 | 1.12 | 1.03 |
| specific viscosity of polymer at second step | | 0.80 | 0.84 | 0.80 | 0.80 | 0.81 | 0.82 | 0.79 | 0.80 | 0.82 | 0.80 |
| average particle size of latex (Å) | | 1600 | 1600 | 1500 | 1600 | 1700 | 1500 | 1600 | 1600 | 1600 | 1700 |
| foamability | | | | | | | | | | | |
| expansion ratio (times) | | 10.0 | 9.1 | 9.1 | 10.6 | 8.0 | 8.0 | 7.4 | 2.2 | 2.4 | 2.5 |
| cell shape | | ○ | ○ | ○ | ○ | ○ | ○ | ○ | Δ | Δ | Δ |

19 and Comparative Examples 7 to 9, respectively. Results are shown in Table 3.

From the results in Table 4, compositions having excellent foamability can be obtained by using polymer samples (11)

TABLE 3

|  |  | Example No. | | | | | Comparative Example | | |
|---|---|---|---|---|---|---|---|---|---|
|  |  | 15 | 16 | 17 | 18 | 19 | 7 | 8 | 9 |
| polymer sample No. |  | (11) | (12) | (13) | (14) | (15) | (16) | (17) | (18) |
| composition (parts) |  |  |  |  |  |  |  |  |  |
| monomer mixture at first step | MMA | 68 | 68 | 68 | 68 | 68 | 68 | 68 | 68 |
|  | BA | 12 | 12 | 12 | 12 | 12 | 12 | 12 | 12 |
| monomer mixture at second step | MMA | 8 | 8 | 5 | 5 | 2 | 16 | 18 | 12 |
|  | BMA | 2 | 2 | — | — | — | 4 | 2 | — |
|  | BA | 10 | 8 | 13 | 13 | 15 | — | — | — |
|  | EA | — | 2 | — | — | 3 | — | — | — |
|  | AN | — | — | 2 | — | — | — | — | 3 |
|  | St | — | — | — | 2 | — | — | — | 5 |
| specific viscosity of polymer at first step |  | 1.12 | 1.12 | 1.13 | 1.13 | 1.07 | 1.12 | 1.13 | 1.09 |
| specific viscosity of polymer at second step |  | 0.84 | 0.82 | 0.83 | 0.85 | 0.78 | 0.80 | 0.82 | 0.78 |
| average particle size of latex (Å) |  | 1600 | 1600 | 1600 | 1600 | 1500 | 1600 | 1600 | 1600 |
| foamability |  |  |  |  |  |  |  |  |  |
| expansion ratio (times) |  | 10.8 | 10.0 | 9.3 | 10.0 | 7.4 | 2.5 | 2.2 | 2.1 |
| cell shape |  | ○ | ○ | ○ | ○ | ○ | Δ | Δ | Δ |

From the results in Table 3, compositions having excellent foamability can be obtained by using polymer samples (11) to (15), wherein the composition of the monomer mixture (b) is within the range of the present invention. On the other hand, in Comparative Examples 7 to 9, wherein the substance corresponding to monomer mixture (b) having composition out of the range of the present invention is used, foamability became low.

Examples 20 to 24 and Comparative Examples 10 to 12

By using polymer samples (11) to (18) obtained in Examples 15 to 19 and Comparative Examples 7 to 9, molded articles having a round bar shape were obtained in the same manner as in Example 8, to evaluate the properties thereof. These samples were designated as Examples 20 to 24 and Comparative Examples 10 to 12, respectively. Results are shown in Table 4.

to (15), of which composition of the monomer mixture (b) is within the range of the present invention. On the other hand, in Comparative Examples 10 to 12, wherein the substance corresponding to monomer mixture (b) having composition out of the range of the present invention is used, foamability became low.

Examples 25 to 28 and Comparative Examples 13 to 14

According to the components and the composition shown in Table 5, polymer samples (19) to (24) were obtained in the same manner as in Example 1 to measure properties thereof. And the obtained polymer samples (19) to (24) were mixed with poly(vinyl chloride), respectively, in the same manner as in Example 1 to obtain the foamed article having a round bar shape to evaluate the properties thereof. These samples were designated as Examples 25 to 28 and Comparative Examples 13 to 14, respectively. Results are shown in Table 5.

TABLE 4

|  |  | Example No. | | | | | Comparative Example | | |
|---|---|---|---|---|---|---|---|---|---|
|  |  | 20 | 21 | 22 | 23 | 24 | 10 | 11 | 12 |
| polymer sample No. |  | (11) | (12) | (13) | (14) | (15) | (16) | (17) | (18) |
| composition (parts) |  |  |  |  |  |  |  |  |  |
| monomer mixture at first step | MMA | 68 | 68 | 68 | 68 | 68 | 68 | 68 | 68 |
|  | BA | 12 | 12 | 12 | 12 | 12 | 12 | 12 | 12 |
| monomer mixture at second step | MMA | 8 | 8 | 5 | 5 | 2 | 16 | 18 | 12 |
|  | BMA | 2 | 2 | — | — | — | 4 | 2 | — |
|  | BA | 10 | 8 | 13 | 13 | 15 | — | — | — |
|  | EA | — | 2 | — | — | 3 | — | — | — |
|  | AN | — | — | 2 | — | — | — | — | 3 |
|  | St | — | — | — | 2 | — | — | — | 5 |
| specific viscosity of polymer at first step |  | 1.12 | 1.12 | 1.13 | 1.13 | 1.07 | 1.12 | 1.13 | 1.09 |
| specific viscosity of polymer at second step |  | 0.84 | 0.82 | 0.83 | 0.85 | 0.78 | 0.80 | 0.82 | 0.78 |
| average particle size of latex (Å) |  | 1600 | 1600 | 1600 | 1600 | 1500 | 1600 | 1600 | 1600 |
| foamability |  |  |  |  |  |  |  |  |  |
| expansion ratio (times) |  | 10.6 | 10.0 | 9.3 | 10.0 | 7.4 | 2.7 | 2.5 | 2.2 |
| cell shape |  | ○ | ○ | ○ | ○ | ○ | Δ | Δ | Δ |

TABLE 5

|  |  | Example No. | | | | Comparative Example | |
|---|---|---|---|---|---|---|---|
|  |  | 25 | 26 | 27 | 28 | 13 | 14 |
| polymer sample No. |  | (19) | (20) | (21) | (22) | (23) | (24) |
| composition (parts) |  |  |  |  |  |  |  |
| monomer mixture at first step | MMA | 51 | 60 | 68 | 77 | 32 | 24 |
|  | BA | 9 | 10 | 12 | 13 | 8 | 6 |
| monomer mixture at second step | MMA | 12 | 9 | 6 | 3 | 18 | 21 |
|  | BA | 28 | 21 | 14 | 7 | 42 | 49 |
| specific viscosity of polymer at first step |  | 1.23 | 1.18 | 1.12 | 1.06 | 1.35 | 1.42 |
| specific viscosity of polymer at second step |  | 0.80 | 0.79 | 0.84 | 0.82 | 0.80 | 0.82 |
| average particle size of latex (Å) |  | 1500 | 1500 | 1600 | 1600 | 1600 | 1600 |
| foamability |  |  |  |  |  |  |  |
| expansion ratio (times) |  | 6.4 | 7.4 | 9.3 | 7.4 | 2.5 | 2.5 |
| cell shape |  | ○ | ○ | ○ | ○ | Δ | Δ |

From the results in Table 5, compositions having excellent foamability can be obtained by using polymer samples (19) to (22), wherein an amount of the monomer mixture (a) is within the range of the present invention. On the other hand, in case of the polymer samples (23) and (24), wherein an amount of the monomer mixture (a) is smaller than that of the present invention, foamability was not sufficient.

Examples 29 to 32 and Comparative Examples 15 to 16

By using polymer samples (19) to (24) obtained in Examples 25 to 28 and Comparative Examples 13 to 14, foamed articles having a round bar shape were obtained in the same manner as in Example 8, to evaluate the properties thereof. These samples were designated as Examples 29 to 32 and Comparative Examples 15 to 16, respectively. Results are shown in Table 6.

Examples 33 to 36

According to the components and the composition shown in Table 7, polymer samples (25) to (28) were obtained in the same manner as in Example 1 to measure properties thereof. And the obtained polymer samples (25) to (28) were mixed with poly(vinyl chloride), respectively, in the same manner as in Example 1 to obtain the foamed article having a round bar shape to evaluate the properties thereof. These samples

TABLE 6

|  |  | Example No. | | | | Comparative Example | |
|---|---|---|---|---|---|---|---|
|  |  | 29 | 30 | 31 | 32 | 15 | 16 |
| polymer sample No. |  | (19) | (20) | (21) | (22) | (23) | (24) |
| composition (parts) |  |  |  |  |  |  |  |
| monomer mixture at first step | MMA | 51 | 60 | 68 | 77 | 32 | 24 |
|  | BA | 9 | 10 | 12 | 13 | 8 | 6 |
| monomer mixture at second step | MMA | 12 | 9 | 6 | 3 | 18 | 21 |
|  | BA | 28 | 21 | 14 | 7 | 42 | 49 |
| specific viscosity of polymer at first step |  | 1.23 | 1.18 | 1.12 | 1.06 | 1.35 | 1.42 |
| specific viscosity of polymer at second step |  | 0.80 | 0.79 | 0.84 | 0.82 | 0.80 | 0.82 |
| average particle size of latex (Å) |  | 1500 | 1500 | 1600 | 1600 | 1600 | 1600 |
| foamability |  |  |  |  |  |  |  |
| expansion ratio (times) |  | 6.4 | 7.4 | 9.8 | 7.4 | 2.9 | 2.4 |
| cell shape |  | ○ | ○ | ○ | ○ | Δ | Δ |

From the results in Table 6, compositions having excellent foamability can be obtained by using polymer samples (19) were designated as Examples 33 to 36, respectively. Results are shown in Table 7.

TABLE 7

| Example No. | | 33 | 34 | 35 | 36 |
|---|---|---|---|---|---|
| polymer sample No. | | (25) | (26) | (27) | (28) |
| composition (parts) | | | | | |
| monomer mixture at first step | MMA | 68 | 68 | 68 | 68 |
| | BA | 12 | 12 | 12 | 12 |
| monomer mixture at second step | MMA | 6 | 6 | 6 | 6 |
| | BA | 14 | 14 | 14 | 14 |
| polymerization initiator (parts) | | 0.05 | 0.01 | 0.005 | 0.001 |
| emulsifier (parts) | | 0.7 | 0.7 | 0.7 | 0.7 |
| specific viscosity of polymer at first step | | 0.92 | 1.01 | 1.14 | 1.22 |
| specific viscosity of polymer at second step | | 0.63 | 0.73 | 0.88 | 1.09 |
| average particle size of latex (Å) | | 1600 | 1500 | 1600 | 1600 |
| foamability | | | | | |
| expansion ratio (times) | | 7.4 | 10.0 | 15.6 | 17.5 |
| cell shape | | ○ | ○ | ○ | ○ |

Examples 37 to 40

By using the polymer samples (25) to (28) obtained in Examples 33 to 36, foamed articles having a round bar shape were obtained in the same manner as in Example 8 to evaluate the properties thereof. The examples were designated as Examples 37 to 40, respectively. Results are shown in Table 8.

TABLE 8

| Example No. | | 37 | 38 | 39 | 40 |
|---|---|---|---|---|---|
| polymer sample No. | | (25) | (26) | (27) | (28) |
| composition (parts) | | | | | |
| monomer mixture at first step | MMA | 68 | 68 | 68 | 68 |
| | BA | 12 | 12 | 12 | 12 |
| monomer mixture at second step | MMA | 6 | 6 | 6 | 6 |
| | BA | 14 | 14 | 14 | 14 |
| polymerization initiator (parts) | | 0.05 | 0.01 | 0.005 | 0.001 |
| emulsifier (parts) | | 0.7 | 0.7 | 0.7 | 0.7 |
| specific viscosity of polymer at first step | | 0.92 | 1.01 | 1.14 | 1.22 |
| specific viscosity of polymer at second step | | 0.63 | 0.73 | 0.88 | 1.09 |
| average particle size of latex (Å) | | 1600 | 1500 | 1600 | 1600 |
| foamability | | | | | |
| expansion ratio (times) | | 7.4 | 10.0 | 11.3 | 12.4 |
| cell shape | | ○ | ○ | ○ | ○ |

Examples 41 to 44 and Comparative Example 17

In order to evaluate foamability difference depending on an amount of the polymer sample (28) used in Example 36 to a poly(vinyl chloride) resin, foamed articles were obtained in the same manner as in Example 36 except that an amount of the polymer sample (28) used in Example 36 based on 100 parts of a poly(vinyl chloride) resin was changed to amounts shown in Table 9 instead of 10.0 parts, and an amount of water as a foaming agent was changed to amounts shown in Table 9 instead of 3.0 parts, to evaluate foamability. Results are shown in Table 9. But in Comparative Example 17, uniformity of the composition decreased and molded articles suitable for evaluating foamability could not be obtained.

TABLE 9

| Example No. | 41 | 42 | 43 | 44 | Comparative Example 17 |
|---|---|---|---|---|---|
| polymer sample No. | (28) | (28) | (28) | (28) | (28) |
| polymer sample (parts) | 6 | 8 | 15 | 20 | 40 |
| water (parts) | 1 | 2 | 3.5 | 4 | 4 |
| foamability | | | | | |
| expansion ratio (times) | 6.1 | 8.2 | 13.1 | 15.4 | — |
| cell shape | ○ | ○ | ○ | ○ | — |

From the results in Table 9, compositions mixed with the polymer sample (28) in the range of the present invention exhibited excellent foamability.

Examples 45 to 48 and Comparative Examples 18 to 19

In order to evaluate foamability difference depending on an amount of the polymer sample (28) used in Example 40 to a poly(vinyl chloride) resin, foamed articles were obtained in the same manner as in Example 40 except that an amount of the polymer sample (28) used in Example 40 based on 100 parts of a poly(vinyl chloride) resin was changed to amounts shown in Table 10 instead of 10.0 parts, and an amount of water as a foaming agent was changed to amounts shown in Table 9 instead of 4.0 parts, to evaluate foamability. Results are shown in Table 10. But in Comparative Example 19, uniformity of the composition decreased and molded article suitable for evaluating foamability could not be obtained.

Example 36 based on 100 parts of poly(vinyl chloride) was changed to 10.0 parts and the kind of the foaming agent and an amount thereof were changed to a value described in Table 11, to evaluate foamability thereof. Results are shown in Table 11. ADCA in Table designates azodicarbonamide.

TABLE 11

|  |  | Example No. | | | | Comparative Example | | | |
| --- | --- | --- | --- | --- | --- | --- | --- | --- | --- |
|  |  | 49 | 50 | 51 | 52 | 20 | 21 | 22 | 23 |
| polymer sample | No. | (28) | (28) | (28) | (28) | (28) | (28) | (28) | (28) |
| emulsifier | kind | water | water | water | water | water | water | ADCA | ADCA |
|  | amount (parts) | 5 | 6 | 8 | 5 | 0.2 | 17 | 2 | 5 |
| foamability |  |  |  |  |  |  |  |  |  |
| expansion ratio (times) |  | 11.7 | 11.8 | 11.4 | 6.8 | 3.8 | 3.0 | 3.2 | 2.4 |
| cell shape |  | ○ | ○ | ○ | ○ | Δ | X | ○ | X |

From the results in Table 11, composition mixed with water in the range of the present invention exhibited excellent foamability, but as in Comparative Examples 21 and 22, if an amount thereof was reduced or increased to out of the range of the present invention, foamability was not sufficient. And as in Comparative Examples 22 and 23, if the thermal decomposition organic foaming agent was solely used as a foaming agent, foamability was not sufficient.

Examples 53 to 57 and Comparative Examples 24 to 26

In order to evaluate foamability difference depending on the kind of a foaming agent and an amount thereof, foamed articles were obtained in the same manner as in Example 40 except that an amount of the polymer sample (28) used in Example 40 based on 100 parts of poly(vinyl chloride) was changed to 10.0 parts and the kind of foaming agent and an amount thereof were changed to a value described in Table 12, to evaluate foamability thereof. Results are shown in Table 12.

TABLE 10

|  |  |  |  |  | Comparative Example | |
| --- | --- | --- | --- | --- | --- | --- |
| Example No. | 45 | 46 | 47 | 48 | 18 | 19 |
| polymer sample No. | (28) | (28) | (28) | (28) | (28) | (28) |
| polymer sample (parts) | 6 | 8 | 15 | 20 | 3 | 40 |
| foaming agent (parts) | 2 | 3 | 5 | 6 | 0.3 | 6 |
| foamability |  |  |  |  |  |  |
| expansion ratio (times) | 6.8 | 10.0 | 13.1 | 15.4 | 3.2 | — |
| cell shape | ○ | ○ | ○ | ○ | ○ | — |

From the results in Table 10, compositions mixed with the polymer sample (28) in the range of the present invention exhibited excellent foamability. But as in Comparative Example 18, if an amount of the polymer was reduced to below the range of the present invention, foamability slightly decreased.

Examples 49 to 52 and Comparative Examples 20 to 23

In order to evaluate foamability difference depending on the kind of a foaming agent and an amount thereof, foamed articles were obtained in the same manner as in Example 36 except that an amount of the polymer sample (28) used in

TABLE 12

|  |  | Example No. | | | | | Comparative Example | | |
| --- | --- | --- | --- | --- | --- | --- | --- | --- | --- |
|  |  | 53 | 54 | 55 | 56 | 57 | 24 | 25 | 26 |
| polymer sample | No. | (28) | (28) | (28) | (28) | (28) | (28) | (28) | (28) |
| emulsifier | kind | boric acid | boric acid | boric acid | zeolite | boric acid | boric acid | ADCA | ADCA |
|  | amount (parts) | 5 | 6 | 8 | 5 | 1.5 | 32 | 2 | 5 |
| foamability |  |  |  |  |  |  |  |  |  |
| expansion ratio (times) |  | 11.5 | 11.8 | 11.4 | 6.8 | 4.2 | 2.4 | 3.2 | 2.4 |
| cell shape |  | ○ | ○ | ○ | ○ | Δ | X | ○ | X |

From the results in Table 12, compositions in Examples 53 to 57 mixed with the substance generating steam by heating in the range of the present invention exhibited excellent foamability, but as in Comparative Example 24, if an amount thereof was increased to above the range of the present invention, foamability was not sufficient. If the amount was decreased to 1.5 parts as in Example 57, foamability slightly decreased. And as in Comparative Examples 25 and 26, if the thermal decomposition organic foaming agent was solely used as a foaming agent, foamability was not sufficient.

Examples 58 to 61 and Comparative Example 27

In order to evaluate foamability difference depending on the kind and an amount of a thermal decomposition foaming agent mixed with water as a foaming agent, foamed articles were obtained in the same manner as in Example 36 except that an amount of the polymer sample (28) used in Example 36 based on 100 parts of poly(vinyl chloride) was changed to 10.0 parts and the kind of foaming agent and an amount thereof were changed to values described in Table 13, to evaluate foamability thereof. Results are shown in Table 13.

SBC in Table designates sodium bicarbonate.

TABLE 13

| Example No. | 58 | 59 | 60 | 61 | Comparative Example 27 |
|---|---|---|---|---|---|
| polymer sample No. | (28) | (28) | (28) | (28) | (28) |
| thermal decomposition foaming agent (parts) | SBC 4 | SBC 10 | ADCA 1.5 | ADCA 2 | SBC 22 |
| foamability | | | | | |
| expansion ratio (times) | 14.0 | 12.7 | 12.7 | 12.7 | 3.4 |
| cell shape | ○ | ○ | ○ | ○ | X |

From the results in Table 13, compositions mixed with the thermal decomposition foaming agent in the range of the present invention exhibited excellent foamability, but as in Comparative Example 29, if the amount thereof was increased to above the range of the present invention, foamability was not sufficient.

Examples 62 to 66 and Comparative Example 28

In order to evaluate foamability difference depending on the kind and an amount of a thermal decomposition foaming agent mixed with the substance generating steam by heating as a foaming agent, foamed articles were obtained in the same manner as in Example 40 except that an amount of the polymer sample (28) used in Example 40 based on 100 parts of polyvinyl chloride was changed to 10.0 parts and the kind and the amount of the thermal decomposition foaming agent were changed a to value described in Table 14, to evaluate foamability thereof. Results are shown in Table 14.

TABLE 14

| | Example No. | | | | | Comparative |
|---|---|---|---|---|---|---|
| | 62 | 63 | 64 | 65 | 66 | Example 28 |
| polymer sample No. | (28) | (28) | (28) | (28) | (28) | (28) |
| substance generating steam (parts) | boric acid 4 | boric acid 4 | boric acid 4 | boric acid 4 | zeolite 5 | boric acid 15 |
| thermal decomposition foaming agent (parts) | SBC 4 | SBC 10 | ADCA 2 | ADCA 2.5 | ADCA 1.5 | SBC 22 |
| foamability | | | | | | |
| expansion ratio (times) | 12.5 | 14.2 | 12.5 | 12.8 | 7.8 | 3.4 |
| cell shape | ○ | ○ | ○ | ○ | ○ | X |

From the results in Table 14, compositions mixed with the thermal decomposition foaming agent in the range of the present invention exhibited excellent foamability, but as in Comparative Example 30, if the amount thereof was increased to above the range of the present invention, foamability was not sufficient.

INDUSTRIAL APPLICABILITY

The foamable vinyl chloride resin composition of the present invention comprises a vinyl chloride resin, a specific (meth)acrylate copolymer, and water or water and a thermal decomposition foaming agent, wherein the (meth)acrylate copolymer is obtained by adding and polymerizing 0 to 50 parts of a monomer mixture (b) comprising 0 to 50% by weight of methyl methacrylate, 50 to 100% by weight of at least one monomer selected from the group consisting of methacrylate excluding methyl methacrylate and acrylate, and 0 to 20% by weight of a vinyl monomer copolymerizable therewith, in the presence of a latex of a (co)polymer obtained by emulsion polymerizing 50 to 100 parts by weight of a monomer mixture (a) comprising 50 to 100% by weight of methyl methacrylate, 0 to 50% by weight of a monomer selected from the group consisting of methacrylate excluding methyl methacrylate and acrylate, and 0 to 20% of a vinyl monomer copolymerizable therewith in an amount that a total amount of (a) and (b) is 100 parts by weight, in particular amounts thereof. Therefore, foamed articles having a high expansion ratio of more than 5 to 15 times can be obtained, and cell shape is excellent.

And since in the foamable vinyl chloride resin composition of the present invention the water is steam generated by heating, the foamed articles having a high expansion ratio of more than 5 to 10 times can be obtained and cell shape thereof is excellent.

What is claimed is:

1. A foamable poly(vinyl chloride) resin composition comprising 100 parts by weight of (A) a poly(vinyl chloride) resin, 0.5 to 30 parts by weight of (B) a processing aid, and 0.5 to 15 parts by weight of water and 0 to 20 parts by weight of a thermal decomposition foaming agent as a foaming agent (C), wherein the processing aid is obtained by adding and polymerizing 5 to 40 parts by weight of a monomer mixture (b) comprising 0 to 50% by weight of methyl methacrylate, 50 to 100% by weight of at least one monomer selected from the group consisting of methacrylate excluding methyl methacrylate and acrylate, and 0 to 20% by weight of a vinyl monomer copolymerizable therewith, in the presence of a latex of a (co)polymer obtained by emulsion polymerizing 60 to 95 parts by weight of a monomer mixture (a) comprising 50 to 100% by weight of methyl methacrylate, 0 to 50% by weight of a monomer selected from the group consisting of methacrylate excluding methyl methacrylate and acrylate, and 0 to 20% by weight of a vinyl monomer copolymerizable therewith in an amount that a total amount of (a) and (b) is 100 parts by weight.

2. The foamable poly(vinyl chloride) resin composition of claim 1, wherein the water is steam generated by heating 0.5 to 30 parts by weight of a substance.

3. The foamable poly(vinyl chloride) resin composition of claim 1, wherein the processing aid (B) is a (meth)acrylate copolymer which is obtained by adding and polymerizing 0 to 50 parts by weight of a monomer mixture (b) comprising 0 to 50% by weight of methyl methacrylate, 50 to 100% by weight of at least one monomer selected from the group consisting of methacrylate excluding methyl methacrylate and acrylate, and 0 to 20% by weight of a vinyl monomer copolymerizable therewith and wherein specific viscosity at 30° C. of the solution containing 0.1 g of the polymer mixture in 100 mL of chloroform is at least 0.5, in the presence of a latex of a (co)polymer which is obtained by emulsion polymerizing 50 to 100 parts by weight of a monomer mixture (a) comprising 50to 100% by weight of methyl methacrylate, 0 to 50% by weight of a monomer selected from a group consisting of methacrylate excluding methyl methacrylate, and acrylate, and 0 to 20% of a vinyl monomer copolymerizable therewith in an amount that a total amount of (a) and (b) is 100 parts by weight, and wherein specific viscosity at 30° C. of the solution containing 0.1 g of the polymer mixture in 100 mL of chloroform is at least 0.7.

* * * * *